United States Patent
Fukumine

(10) Patent No.: US 7,864,508 B2
(45) Date of Patent: Jan. 4, 2011

(54) ELECTRODE MATERIAL FOR ELECTRIC DOUBLE LAYER CAPACITOR, METHOD FOR PRODUCING THE SAME, ELECTRODE FOR ELECTRIC DOUBLE LAYER CAPACITOR AND ELECTRIC DOUBLE LAYER CAPACITOR

(75) Inventor: Yoshio Fukumine, Tokyo (JP)

(73) Assignee: Zeon Corporation, Tokyo (JP)

(*) Notice: Subject to any disclaimer, the term of this patent is extended or adjusted under 35 U.S.C. 154(b) by 536 days.

(21) Appl. No.: 11/887,317

(22) PCT Filed: Mar. 28, 2006

(86) PCT No.: PCT/JP2006/306314

§ 371 (c)(1),
(2), (4) Date: Sep. 27, 2007

(87) PCT Pub. No.: WO2006/106680

PCT Pub. Date: Oct. 12, 2006

(65) Prior Publication Data

US 2009/0284900 A1    Nov. 19, 2009

(30) Foreign Application Priority Data

Mar. 30, 2005 (JP) ............... 2005-099266

(51) Int. Cl.
*H01G 9/00* (2006.01)

(52) U.S. Cl. .............. 361/502; 361/503; 361/504; 361/509; 361/512; 361/523

(58) Field of Classification Search .............. 361/502, 361/503–504, 508–512, 523–525, 528–529, 361/516, 534, 540
See application file for complete search history.

(56) References Cited

U.S. PATENT DOCUMENTS 5,973,912 A * 10/1999 Kibi et al. .................. 361/502
6,301,093 B1 * 10/2001 Noguchi et al. ............. 361/512
6,377,441 B1 * 4/2002 Ohya et al. ................. 361/502
6,574,092 B2 * 6/2003 Sato et al. .................. 361/502
6,741,450 B2 * 5/2004 Nakazawa et al. .......... 361/502
7,486,497 B2 * 2/2009 Kobayashi et al. .......... 361/502
7,567,429 B2 * 7/2009 Mori et al. .................. 361/502
2005/0064289 A1    3/2005 Suzuki et al.

FOREIGN PATENT DOCUMENTS

| CN | 1585159 A | 2/2005 |
| JP | 62-179711 A | 8/1987 |
| JP | 11-149918 A | 6/1999 |
| JP | 11-162794 A | 6/1999 |
| JP | 2003-109591 A | 4/2003 |
| JP | 2005-26191 A | 1/2005 |
| JP | 2005-063846 A | 3/2005 |
| WO | WO-2004/107481 A1 | 12/2004 |

OTHER PUBLICATIONS

Chinese Office Action dated Dec. 18, 2009 for corresponding Chinese Application No. 2006800097640.
Office Action in JP 2007-512755 dated Aug. 24, 2010 and partial English langauge translation thereof (6 pages).

* cited by examiner

*Primary Examiner*—Nguyen T Ha
(74) *Attorney, Agent, or Firm*—Birch, Stewart, Kolasch & Birch, LLP

(57) ABSTRACT

An electrode material for an electric double layer capacitor, where a moldability is good, a flexion resistance and a cohesiveness to a current collector after molding into an active material layer are high and an internal resistance can be reduced, an electrode for an electric double layer capacitor obtained using the electrode material, and a capacitor are provided. The electrode material for the electric double layer capacitor is composed of a mixture particle containing a binder and an electrode active material, and in said mixture particle, 50 area % or more of a surface of said mixture particle has been coated with the binder.

17 Claims, No Drawings

ELECTRODE MATERIAL FOR ELECTRIC DOUBLE LAYER CAPACITOR, METHOD FOR PRODUCING THE SAME, ELECTRODE FOR ELECTRIC DOUBLE LAYER CAPACITOR AND ELECTRIC DOUBLE LAYER CAPACITOR

TECHNICAL FIELD

The present invention relates to an electrode material for an electric double layer capacitor having excellent moldability, and high flexion resistance and cohesiveness to a current collector when configured as an active material layer, and giving an electric double layer capacitor having an increased electrostatic capacity and a reduced an internal resistance, as well as a method for producing the same. The present invention further relates to electrode for an electric double layer capacitor and an electric double layer capacitor obtained with the electrode material.

BACKGROUND ART

An electric double layer capacitor is capable of being configured in small size and light weight, having a high energy density, and being charged and discharged repeatedly. Taking advantage of its properties, the demand for electric double layer capacitor is rapidly increasing. Since the electric double layer capacitor can be charged and discharged rapidly, the capacitor is utilized as a small size power supply for memory backup in personal computers. In recent years, its application to a large size power supply for electric automobiles is expected for overcoming environmental problems and resource problems. With such an expansion of usage and growth, there is a demand for further improving the properties of the electric double layer capacitor, e.g., reduction of the internal resistance, increase of the electrostatic capacity and enhancement of mechanical property.

In order to enhance these properties, various improvements are being made as to materials for forming the active material layer on the current collector (in the present invention, such a material is referred to as an electrode material for the electric double layer capacitor or simply an electrode material). The electrode material for the electric double layer capacitor contains an electrode active material such as activated carbon as a major component, and optionally contains conductive materials and binders for imparting functions such as conductivity, cohesiveness and flexibility to the electrode. However, these components other than the electrode active material may cause reduction of electrode properties, e.g., the increase of resistance in the electrode and the reduction of a capacitor capacity.

In Patent document 1, it is disclosed that the electrode material for the electric double layer capacitor is obtainable by dispersing in water powders obtained by pulverizing activated carbon fibers as an electrode active material, mixing the dispersion with latex of chlorosulfonated polyethylene as a binder, subsequently removing the water and pulverizing/ granulating a resulting solid.

Patent document 2 discloses a composite particle (corresponding to the mixture particle in the present invention) comprising an electrode active material, a conducting auxiliary agent and a binder, obtained by a fluidized bed granulation method, where the conducting auxiliary agent and the binder have been cohered and integrated.

Patent Document 1: JP Sho-62-179711 A

Patent Document 2: JP 2005-26191 A

DISCLOSURE OF INVENTION

Problem To Be Solved by the Invention

However, the electrode material disclosed in Patent document 1 has low molding processability and it is not easy to obtain the uniform electrode therefrom. With the electrode material disclosed in Patent document 2, the cohesiveness of the resulting active material layer to the current collector is insufficient.

The present invention has been made in the light of the aforementioned circumstances of prior art. It is an object of the present invention to provide an electrode material for an electric double layer capacitor having good moldability, having high cohesiveness to the current collector, and giving increased electrostatic capacity and reduced internal resistance in the resulting electric double layer capacitor; as well as an electrode for an electric double layer capacitor and a capacitor obtained with the electrode material.

Means for Solving Problem

The present inventors focused on a distribution of each ingredient in the electrode material for the electric double layer capacitor, and studied extensively. As a result, the present inventors have found the facts as follows. The prior-art electrode materials have a uniform distribution of the active material which is an ingredient exhibiting an electrode activity, and the binder which is another ingredient exhibiting a binding property. However, when a particulate material is employed as the electrode material (in the present invention, such a particulate electrode material is referred to as a mixture particle) and the binder is unevenly distributed on the surface of the mixture particle, the cohesiveness between the current collector and the active material layer is increased and the resulting electrode exhibits excellent performances. The present inventors have also found that the ratio of the covered surface of the mixture particle is appropriate as an index of this unevenness, and such an unevenness can be measured by an X ray photoelectron spectrometry. Using this measurement method, the ratio of coated surface in various electrode materials for the electric double layer capacitors was measured. As a result, it was found out that the prior-art materials, i.e., those which can not accomplish the object of the present invention all exhibited the values of about 10 to 25 area % (see Comparative Example of the present application). On the contrary, it was also found that those exhibiting the values of 50 area % or more resulted in high cohesiveness between the current collector and the active material layer, and an excellent properties of the electrode, to an extent that the object of the present invention is accomplished.

The present invention has been completed on the basis of the aforementioned findings. That is, the electrode material for an electric double layer capacitor of the present invention is an electrode material for an electric double layer capacitor comprising a mixture particle, containing a binder and an electrode active material, characterized in that 50 area % or more of the surface of said mixture particle is coated with said binder.

The method for producing an electrode material for an electric double layer capacitor of the present invention is characterized in comprising a step of mixing a raw material, containing said binder having the number average particle diameter from 0.01 to 2 μm and said electrode active material to yield a mixture A; and a step of granulating the resulting mixture A to yield said mixture particle.

The method for producing an electrode for an electric double layer capacitor of the present invention is characterized in comprising a step of forming an active material layer on a current collector using the present electrode material for the electric double layer capacitor.

The electrode for an electric double layer capacitor of the present invention is characterized by being obtained by the aforementioned method for producing the electrode.

The electric double layer capacitor of the present invention is characterized in having the aforementioned electrode.

Effect of the Invention

The electrode material for the electric double layer capacitor of the present invention is excellent in molding processability and can form an active material layer with high cohesiveness on the current collector. The electrode for the electric double layer capacitor obtained by using the electrode material for the electric double layer capacitor has a uniform electrode density, and has an excellent flexibility and a high strength. The electric double layer capacitor obtained using this electrode has a large electrostatic capacity and a small internal resistance.

BEST MODE FOR CARRYING OUT THE INVENTION

Embodiments of the present invention will be described below.

As described above, the electrode material for the electric double layer capacitor of the present invention comprises the mixture particle comprising the binder and the electrode active material, and is characterized in that 50 area % or more of the surface in the mixture particle is coated with the binder. The components which compose the electrode material for the electric double layer capacitor having such a constitution will be described sequentially below.

1. Electrode Active Material

The electrode active material is not limited as long as it realizes accumulation of an electric charge in an electric double layer formed in an interface of the electrode and an electrolyte. As the electrode active material, allotropes of carbon having a specific surface area of 30 $m^2/g$ or more, preferably 500 to 5,000 $m^2/g$ and more preferably 1,000 to 3,000 $m^2/g$ are suitably used. Examples of such an allotrope of carbon may include activated carbon, polyacene, carbon whisker and graphite. Among them, the activated carbon is preferable. Examples of the activated carbon may include phenol-based, rayon-based, acryl-based, pitch-based and palm husk-based activated carbon. These allotropes of carbon are preferably powders or fibers. In addition, a nano-composite of these allotropes of carbon and an organic material can also be used.

Non-porous carbon having fine crystal carbon similar to black lead where an interlayer distance of the fine crystal carbon has been expanded can also be used as the electrode active material. Such non-porous carbon is obtainable by dry distillation of graphtizable carbon containing a developed fine crystal having a multilayer graphite structure at 700 to 850° C., which is then thermally treated with caustic alkali at 800 to 900° C., and further, if necessary, a residual alkali component is removed by heated vapor. The primary particle diameter of the electrode active material is preferably 0.1 to 100 μm and more preferably 1 to 20 μm. The primary particle diameter referred to herein is a median diameter measured by a light diffraction method. When the particle diameter is in this range, it is easy to form the electrode for the electric double layer capacitor as a thin film and the electrostatic capacity can be increased, which is thus preferable.

Each of these electrode active materials can be used alone or in combination of two or more. When the electrode active materials are used in combination, two or more sorts of the electrode active materials having the different particle diameter distribution may be combined for use.

2. Binder

A phase transition temperature of a polymer used as the binder in the present invention is usually represented by a glass transition temperature (Tg), but in the case of having high crystallinity, the phase transition temperature is sometimes represented by a melting point (Tm). It is preferable that the polymer used for the present invention has the glass transition temperature, and the glass transition temperature is usually in the range of −80 to +180° C. Here, the phase transition temperature, the glass transition temperature and the presence or absence thereof, and the melting point are measured in accordance with JIS K7210.

The glass transition temperature of the polymer is preferably −80 to +20° C. and more preferably −60 to 0° C. When the glass transition temperature is in this range, the binder exhibits excellent binding force, and it is possible to mold the electrode for the electric double layer capacitor at relatively low temperature. The binder is used for the purpose of binding the current collector to the electrode active material and optionally the conductive material. By using such a binder, it is possible to impart the strength and the flexibility to the electrode for the electric double layer capacitor.

It is preferable that the binder used for the method for production of the present invention has its number average particle diameter of 0.01 to 2 μm. The number average particle diameter of such a binder is more preferably 0.02 to 1.5 μm and still more preferably 0.03 to 1 μm. The particle shape of such a binder is not particularly limited, but is preferably spherical. Because when the particles are in spherical form, the particles are easily mixed and dispersed, to easily give uniform dispersion. Here, "the number average particle diameter" is a number average particle diameter obtained by measuring the diameter of 100 polymer particles randomly selected on transmission electron micrograms and calculating the arithmetic average value thereof.

Preferable examples of the polymer used as the binder may include diene polymers and acrylate polymers.

The diene polymer is the polymer comprising a monomer unit polymerizing conjugate diene, and a percentage of the monomer unit polymerizing conjugate diene is usually 40% by weight or more, preferably 50% by weight or more, and further preferably 60% by weight or more.

Examples of the conjugate diene used for the production of the diene polymer may specifically include 1,3-butadiene, 1,3-pentadiene, isoprene, 1,3-hexadiene, 2,3-dimethyl-1,3-butadiene, 2-ethyl-1,3-butadiene and 1,3-heptadiene. Among them, 1,3-butadiene and isoprene are preferable, and 1,3-butadiene is more preferable.

The diene polymer may be a copolymer of conjugate diene with other monomers. Examples of the other polymerizable monomers may include aromatic vinyl compounds, α,β-unsaturated nitrile compounds, acrylic acid esters, methacrylic acid esters and unsaturated carboxylic acids.

Examples of the aromatic vinyl compounds may include styrene, α-methylstyrene, 2,4-dimethylstyrene, ethylstyrene and vinyl naphthalene. Among them, styrene is preferable.

Examples of the α,β-unsaturated nitrile compounds may include acrylonitrile and methacrylonitrile.

Examples of the acrylic acid ester may include alkyl acrylates such as methyl acrylate, ethyl acrylate, propyl acrylate, isopropyl acrylate, n-butyl acrylate, isobutyl acrylate, t-butyl acrylate, 2-ethylhexyl acrylate, isooctyl acrylate, isodecyl acrylate, lauryl acrylate, stearyl acrylate and tridecyl acrylate; acrylate esters having a functional group, such as dimethylaminoethyl acrylate, hydroxyethyl acrylate, hydroxypropyl acrylate and glycidyl acrylate.

Examples of the methacrylic acid ester may include alkyl methacrylates such as methyl methacrylate, ethyl methacrylate, propyl methacrylate, isopropyl methacrylate, n-butyl methacrylate, isobutyl methacrylate, t-butyl methacrylate, 2-ethylhexyl methacrylate, isooctyl methacrylate, isodecyl methacrylate, lauryl methacrylate, stearyl methacrylate and tridecyl methacrylate; methacrylate esters having a functional group, such as dimethylaminoethyl methacrylate, hydroxyethyl methacrylate, hydroxypropyl methacrylate and glycidyl methacrylate.

Examples of the unsaturated carboxylic acid may include unsaturated monocarboxylic acids such as acrylic acid, methacrylic acid, crotonic acid and isocrotonic acid, unsaturated polycarboxylic acids such as maleic acid, fumaric acid, citraconic acid, mesaconic acid, glutaconic acid and itaconic acid.

The acrylate polymer is a polymer comprising a monomer unit obtained by polymerization of acrylic acid ester and/or methacrylic acid ester. The ratio of the monomer unit obtained by polymerizing acrylic acid ester and/or methacrylic acid ester in the acrylate polymer is usually 40% by weight or more, preferably 50% by weight or more and further preferably 60% by weight or more.

As the acrylic acid ester and methacrylic acid ester, it is possible to use those previously listed as specific examples of acrylic acid ester and methacrylic acid ester. The acrylate polymer may be a copolymer of acrylate ester and/or methacrylate ester with other monomers. Examples of the copolymerizable monomers may include the aforementioned aromatic vinyl compounds, α,β-unsaturated nitrile compounds and unsaturated carboxylic acids.

A polymerizable compound having two or more carbon-carbon double bonds can also be copolymerized. Specific examples thereof may include dimethacrylic acid esters such as ethylene glycol dimethacrylate, diethylene glycol dimethacrylate, 1,3-butylene glycol dimethacrylate and polyethylene glycol dimethacrylate; diacrylic acid esters such as diethylene glycol diacrylate, 1,3-butylene glycol diacrylate, tripropylene glycol diacrylate, 1,4-butanediol diacrylate, neopentyl glycol diacrylate, 1,6-hexanediol diacrylate, 1,9-nonanediol diacrylate and polyethylene glycol diacrylate; divinyl compounds such as divinyl benzene; trimethacrylic acid esters such as trimethylolpropane trimethacrylate; and triacrylic acid esters such as trimethylolpropane triacrylate. An acrylate polymer having a crosslinking structure can be obtained by copolymerizing these compounds.

The polymer used as the binder may have a core-shell structure obtained by using two or more sorts of monomers and polymerizing in stages by changing the ratio of the monomers in a previous stage and a late stage. It is preferable to produce the polymer having the core-shell structure by polymerizing the monomers which give a first-stage polymer, and then, using this polymer as seed particles, polymerizing other monomers which give the second-stage polymer in the same vessel or after adding a predetermined amount of the first-stage polymer to another polymerization vessel.

The ratio of the core and the shell in the polymer having the core-shell structure is not particularly limited, although the ratio by weight is usually 50:50 to 95:5, preferably 60:40 to 95:5 and more preferably 70:30 to 95:5. As the core and the shell, the aforementioned thermoplastic polymers can be used. In the case of having two glass transition temperatures, the lower glass transition temperature is preferably in the aforementioned range and more preferably the lower one is lower than 0° C. and the higher one is 0° C. or higher. The difference of the glass transition temperatures between the core and the shell is usually 20° C. or higher, and preferably 50° C. or higher.

The method for producing the polymer is not particularly limited. The polymer can be obtained by polymerizing the aforementioned monomer by a known polymerization method such as an emulsion polymerization method, a suspension polymerization method, a dispersion polymerization method and a solution polymerization method. Among them, it is preferable to produce the polymer by the emulsion polymerization method because it is easy to control the particle diameter of the polymer. According to the emulsion polymerization method, the polymer can be obtained as a latex. The "latex" herein represents a dispersion of the polymer in water. The latex obtained by the emulsion polymerization method can be directly used for producing the electrode material for electric double layer capacitor of the present invention without isolating the polymer.

As an emulsifier used for the emulsion polymerization, any of anionic emulsifiers, cationic emulsifiers and nonionic emulsifiers can be used, although the anionic emulsifier is preferable. The amount of the emulsifier to be used is usually about 0.01 to 10 parts by weight and preferably 0.1 to 5 parts by weight relative to 100 parts by weight of total amount of the monomer.

Examples of the anionic emulsifier (surfactant) may include fatty acid salts having 5 to 50 carbon atoms such as sodium laurate, sodium myristate, sodium palmitate, sodium stearate, potassium stearate, sodium oleate and potassium oleate; higher alcohol sulfate ester salts having 5 to 50 carbon atoms such as sodium lauryl sulfate; liquid fatty oil sulfate ester salts such as sodium dodecyl sulfoacetate; sulfate salts of aliphatic amine or aliphatic amide having 5 to 50 carbon atoms, such as sodium oleyl taurine salts and sodium N-methyl oleyl taurine salts; aliphatic alcohol phosphate ester salts having 5 to 50 carbon atoms such as sodium dodecyl phosphate; sulfonate salts of dibasic fatty acid ester, such as sodium di(2-ethylhexyl) sulfosuccinate; and aromatic sulfonate salts such as sodium naphthalene sulfonate and sodium dodecylbenzene sulfonate. These may also be used in the form of free acids.

As the anionic emulsifier (surfactant), it is also possible to use polymer type anionic surfactants. Examples of such anionic polymer surfactants may include polyoxyethylene alkyl ether sulfonic acid and salts thereof; polycarboxylic acid and salts thereof; polymer having sulfonic acid group and salts thereof; and other anionic polymers such as carboxymethylcellulose, alginate soda and rosin soaps.

Examples of the polycarboxylic acid and the salts thereof may include polymers of acrylic acid or methacrylic acid and salts thereof; polymers of unsaturated dibasic acid such as maleic anhydride, maleic acid, fumaric acid and itaconic acid; or copolymers of any of these monomers with other monomers and salts thereof. Examples of the polymer having sulfonic acid group may include lignin sulfonic acid, naphthalene sulfonic acid which may be substituted with alkyl group, benzene sulfonic acid which may be substituted with alkyl group, formalin condensate of aromatic sulfonic acid, e.g., sulfonated products of creosote oil, and polymers of vinyl sulfonic acid.

Among the aforementioned anionic surfactants, higher alcohol sulfate esters, aromatic sulfonic acids and polyoxyethylene alkyl ether sulfonic acid, and salts thereof are preferable, and sodium lauryl sulfate, sodium dodecyl benzene sulfonate and sodium polyoxyethylene alkyl ether sulfonate are particularly preferable.

Each of these binders can be used alone or in combination of two or more. Its amount to be used is usually 0.001 to 50 parts by weight, preferably 0.01 to 10 parts by weight and more preferably 0.1 to 5 parts by weight relative to 100 parts by weight of the electrode active material. When the amount of the binder used is too small, it becomes difficult to mold the electrode material for electric double layer capacitor into a sheet shape. When the amount of the binder used is too large, the internal resistance of the resulting electrode for the electric double layer capacitor is sometimes increased.

3. Other Components

If necessary, the mixture particle constituting the electrode material for the electric double layer capacitor of the present invention may further contain conductive materials, dispersants which will be described later, and other additives.

The conductive material for use in the present invention is one which can impart the conductivity to the electrode material for the electric double layer capacitor. When the mixture particles comprise the conductive material, the conductive material can be evenly dispersed upon electrode formation, which is thus preferable. As the conductive material, carbon-based ones and metal-based ones are usually available. The carbon-based conductive material is suitably used. As the carbon-based conductive material, allotropes of carbon having the conductivity, having no fine pore which are capable of forming the electric double layer may be used. Specific examples thereof may include carbon black such as furnace black, acetylene black, Ketjen black (trade mark of Akzo Nobel Chemicals Besloten Vennootschap), carbon fibers such as those obtained by vapor phase preparation, natural black lead and artificial black lead. Examples of the metal-based conductive material may include particles of titanium oxide, ruthenium oxide, aluminum and nickel; and metal fibers. Among them, carbon black is preferable, and acetylene black and furnace black are more preferable. The primary particle diameter of the conductive material used for the present invention is usually 10 to 500 nm and preferably 20 to 100 nm. The primary particle diameter referred to herein is a median diameter measured by the light diffraction method.

Each of these conductive materials can be used alone or in combination of two or more. Its amount to be used is usually 0 to 50 parts by weight, preferably 0.5 to 15 parts by weight and more preferably 1 to 5 parts by weight relative to 100 parts by weight of the electrode active material. When the amount of the conductive material used is in this range, the electrostatic capacity and the internal resistance can be highly balanced in the resulting electrode.

4. Properties of Mixture Particle

In the present invention, 50 area % or more of the surface of the mixture particle is coated with the binder particles.

In the present invention, the ratio of the surface coated with the binder particles on the surface of the mixture particle (surface coating ratio) is obtained by analyzing the mixture particle using the X ray photoelectron spectrometry under a predetermined condition. In the analysis by the X ray photoelectron spectrometry, it is possible to analyze what kind of an element is bound to a certain element present on the surface of the substance. The surface coating ratio can be quantitatively calculated by selecting the bond inherent to the component of the binder and the bond inherent to the electrode active material, and quantitatively comparing frequencies of signals from them. For example, when the activated carbon is used as the electrode active material, only the carbon-carbon bond (C—C) is present in this component. When a polymer such as acrylate polymer containing a carbon bound to oxygen via double bond (C═O) is used as the binder, the C═O bond can be selected as the representative inherent bond. In the component of the binder, there is the C—C bond in addition to the C═O bond, and the ratio of bond numbers can be calculated from chemical composition formulae. The surface coating ratio is calculated as the ratio of the binder present on the surface of the mixture particle from the ratio of signal frequencies due to the respective bonds and a simple equation with multiple unknowns using the ratio of each bond in each component. When the binder is a fluorine-containing polymer, the surface coating ratio can be obtained in the same way as in the above by selecting the signal from the carbon bound to fluorine (C—F) as the representative signal. When the binder is the diene polymer, the surface coating ratio can be obtained in the same way as in the above by selecting the signal from the carbon bound to the carbon via double bond (C═C) as the representative signal. Details of the measurement methods will be described in the Examples.

In the present invention, the binder in the mixture particle is not evenly but unevenly distributed, and present more abundantly on the surface of the mixture particle than the inside of the mixture particle. By being the binder present more abundantly on the surface of the mixture particle, when the mixture particles are molded on the current collector at temperature equal to or higher than the glass transition temperature of the binder, the cohesiveness to the current collector is remarkably increased. Meanwhile, the content of the binder inside the mixture particle can be reduced. Thus, the conductivity inside the mixture particle is not lowered. Therefore, by using the electrode material of the present invention, it is possible to simultaneously realize the enhancement of the cohesiveness of the active material layer formed on the current collector and the reduction of the electric resistance in the resulting electric double layer capacitor.

It is preferable that the shape of the mixture particle is spherical. Specifically, when a minor axis diameter thereof is $L_1$, a major axis diameter thereof is $L_1$, $L_a=(L_s+L_1)/2$, and $(L_s-L_1) \times 100/L_a$ is a circularity, the circularity is preferably 40% or less, more preferably 20% or less and further more preferably 10% or less. Here, the minor axis diameter $L_s$ and the major axis diameter $L_1$ are averaged values obtained from 100 random particles measured on photographs obtained by observing the mixture particles using the transmission electron microscope. The particle diameter of the mixture particle is usually 0.1 to 1,000 μm, preferably 5 to 500 μm and more preferably 10 to 100 μm. The particle diameter referred to herein is a median diameter measured by the light diffraction method.

When the properties of the mixture particle are in the aforementioned ranges, the mixture particles are easily filled evenly in the active material layer. Thus, evenness of the electrode density in the resulting electrode for the electric double layer capacitor is widely enhanced.

The electrode material for the electric double layer capacitor of the present invention may comprise mixture particles other than the defined in the above, to the extent so as not to impair the effects of the present invention, but the percentage of the mixture particles defined in the above in the electrode material is usually 50% by weight or more, preferably 70% by weight or more, and more preferably 90% by weight or more.

5. Method for Producing Mixture Particle

The method for producing the mixture particle is not particularly limited as long as the mixture particle having the aforementioned properties is obtained. However, in a preferable method, the electrode active material, the binder and optional other components are mixed and granulated. As used herein, the granulation referred to a manipulation of aggregating these components to make particles having the larger particle diameter. Specific examples of granulation methods may include a spray dry granulation method, a rolling fluidized bed granulation method, a compression granulation method, an agitation granulation method, an extrusion granulation method, a pulverization granulation method, a fluidized bed granulation method, a fluidized bed multifunctional granulation method and a melt granulation method. Among them, when the spray dry granulation method and the rolling fluidized bed granulation method are used, highly uniform spherical mixture particles are obtained, which is thus preferable. The spray dry granulation method is particularly preferable because the mixture particles having the high surface coating ratio are thereby obtained.

The spray dry granulation method is the granulation method in which the electrode active material, the binder and optional other components are mixed in the solvent to obtain a liquid dispersion (referred to as a "mixed liquid dispersion" in the present invention) and the liquid dispersion is sprayed from an atomizer using a spray dryer. The sprayed liquid dispersion is dried in a drying column, for obtaining the spherical mixture particles composed of the electrode active material, the binder and other components which had been contained in the liquid dispersion. The solvent for use in preparation of the liquid dispersion is appropriately selected depending on the type of the binder. Preferable solvent are those which do not dissolve the electrode active material and the binder, and which can evenly disperse these components having the particulate shape. Specifically, the water and the organic solvent are usually used, and suitably the water is used. Examples of the organic solvent may include alkyl alcohols such as methyl alcohol, ethyl alcohol and propyl alcohol; alkyl ketones such as acetone and methyl ethyl ketone; ethers such as tetrahydrofuran, dioxane and diglyme; amides such as diethylformamide, dimethylacetamide, N-methyl-2-pyrrolidone (hereinafter sometimes referred to as NMP) and dimethyl imidazolidinone; and sulfur-containing solvents such as dimethylsulfoxide and sulfolane. Among the organic solvents, NMP is preferable.

Each of these solvents can be used alone or in combination of two or more. The amount thereof to be used is adjusted so that a solid content concentration of the liquid dispersion is usually 1 to 50% by weight, preferably 5 to 50% by weight and more preferably 10 to 30% by weight. When the solid content concentration is in this range, the dispersibility of the binder is highly enhanced, which is thus suitable.

A dispersant may be used together with these solvents. The dispersant for use in the present invention is a compound soluble in the solvent to be used, and has function to enhance the dispersibility of the electrode active material and the binder. The dispersant may or may not have the binding force. When the solvent is the water, water-soluble dispersants to be used therewith may be cellulose polymers such as carboxymethylcellulose, methylcellulose and hydroxypropylcellulose, as well as ammonium salts thereof and alkali metal salts thereof; poly(meth)acrylic acid salts such as sodium poly(meth)acrylate; polyvinyl alcohol; polyethylene oxide; polyvinyl pyrrolidone; copolymers of acrylic acid or acrylic acid salt with vinyl alcohol; copolymers of maleic anhydride, maleic acid or fumaric acid with vinyl alcohol; modified polyvinyl alcohol; modified polyacrylic acid; polyethylene glycol; polycarboxylic acid; oxidized starch; phosphoric acid starch; casein; various modified starch; chitin and chitosan derivatives. The aforementioned emulsifier can also be used as the water-soluble dispersant. Here, "(meth)acryl" is a term which represents acryl and methacryl.

When the organic solvent is used as the solvent, organic solvent-soluble dispersants to be used therewith may be fluorine-based polymers such as PVDF, diene polymers and hydrogenated products thereof such as acrylonitrile/butadiene copolymer, and hydrogenated acrylonitrile/butadiene copolymer, which do not have fine particle shape. These are appropriately selected depending on the type of the binder. The water-soluble dispersants are preferable. More preferable are cellulose polymers, ammonium salts thereof and alkali metal salts thereof, and anionic emulsifiers.

Each of these dispersants may be used alone or in combination of two or more. The adding amount of the dispersant is not particularly limited, although the amount may be 0 to 50 parts by weight, preferably 0.1 to 10 parts by weight and more preferably 0.5 to 5 parts by weight relative to 100 parts by weight of the electrode active material.

A mixing method used for preparing the mixed liquid dispersion is not particularly limited. For example, mixing machines such as a ball mill, a sand mill, a pigment dispersing machine, a stone mill, an ultrasonic dispersing machine, a homogenizer and a planetary mixer can be used. Conditions for mixing may be appropriately selected depending on the type of the mixture. Usually, a mixing temperature is room temperature to 80° C. and a mixing time is 10 minutes to several hours.

The pH value of the mixed liquid dispersion is preferably 7.5 to 11 and more preferably 8 to 10. When the pH value is in this range, the mixture-particle having the high surface coating ratio is easily obtained. As the method for adjusting pH in this range, for example, the known method of adding ammonia water can be employed, although the method is not particularly limited thereto.

The method for spraying the resulting mixed liquid dispersion is not particularly limited. For example, it is preferable to use a spray drying machine (also referred to as a spray dryer) which is generally used. The spray dryer is composed of a pulverizing section, a drying section and a powder collecting section. The pulverizing section comprises an apparatus (atomizer) which makes the liquid dispersion into fine liquid drops and introducing them into the drying section. The types of the atomizer are roughly classified into a rotary disc type and a spray type, and both can be preferably used. In the rotary disc type atomizer, a neat of the liquid dispersion is introduced into a nearly central portion of the disc rotating at high speed, and the liquid dispersion is made into the fine liquid drops when the neat of the liquid dispersion is separated from the disc. The rotation speed of the disc depends on the size of the disc, but is usually 5,000 to 30,000 rpm and preferably 15,000 to 30,000 rpm. Because the slower the rotation speed is, the larger the particle diameter of the mixture particle is, it is possible to reduce the specific surface area of the mixture particle and increase the surface coating ratio by reducing the rotation speed. In the spray type, the liquid dispersion is sprayed with pressure from a nozzle to make a fine liquid drop shape. The temperature of the mixed liquid dispersion to be sprayed is usually about 20 to 250° C. In the drying section, a hot wind is distributed inside. In this section, the solvent in the liquid drops of the liquid dispersion trivialized by the atomizer is evaporated and removed with hot wind, and the solid content contained in the mixed liquid dispersion is dried to become the spherical mixture particle. The temperature of the hot wind is usually 80 to 300° C. and preferably 100 to 200° C. The resulting mixture particles are collected in the powder collecting section. In the mixture particle obtained by this method, the electrode active material and the binder are balanced well, and the particle has an almost uniform spherical shape and particle diameter. Drying of the liquid dispersion results in aggregation of the particles and an improved bulk density of the electrode material. By such a method, the electrode material for the electric double layer capacitor of the present invention can be produced efficiently.

The rolling fluidized bed granulation method, the agitation granulation method, the fluidized-bed granulation method and the fluidized-bed multifunctional granulation method are the methods in which the binder is sprayed onto the electrode active material which is forced to fluidize. In respective methods, principles for fluidizing the fluidized bed of the electrode active material are different. In the rolling granulation method, the electrode active material and optional other components are rolled inside a rotary vessel such as a rotary drum or a rotary dish. In the agitation granulation method, a streaming movement is forcibly given to the raw material powders by stirring wings provided in the vessel. In the fluidized-bed granulation method, the powders are floated and suspended in a fluid blowing up from beneath and this state is kept. In the fluidized-bed multifunctional granulation method, the rolling and the stirring are combined with the fluidized-bed granulation method. The method of spraying the binder to the fluidizing electrode active material is not particularly limited, but preferably, the liquid dispersion containing the binder is sprayed. By aggregating and granulating in this way, it is possible to obtain the mixture particle which composes the electrode material of the present invention. The temperature of the fluidized-bed containing the electrode active material is usually room temperature to 100° C., and the liquid dispersion is usually sprayed at 50 to 250° C.

In these granulation methods, when other components, e.g. the conductive material and the dispersant, are used, they may be fluidized together with the electrode active material or may be sprayed together with the binder to the electrode active material. When such other components are fluidized together with the electrode active material, it is preferable to previously adhere such other components such as a conductive material onto the surface of the electrode active material because the materials having different specific gravities can be dispersed evenly. As an example of the method for adhering the conductive material to the surface of the electrode active material, there is a mechanochemical treatment in which the electrode active material and the conductive material are mixed while adding mechanical external force such as compression force or shearing force. As the apparatus for performing the mechanochemical treatment, kneaders such as a pressure kneader or a twin-roll kneader; high speed impact-type dry powder conjugating apparatuses such as rotary ball mills and hybridization system (supplied from Nara Machinery Co., Ltd.); compression shear-type dry conjugating apparatuses such as mechanofusion system (supplied from Hosokawa Micron Ltd.) can be used. When other components are sprayed together with the binder, for example, the binder, the conductive material and the dispersant can be evenly mixed in the solvent, and the resulting mixed liquid dispersion can be sprayed to the fluidized-bed of the electrode active material to granulate.

By producing the mixture particle in accordance with the aforementioned methods, the dispersibility of the binder and the electrode active material is enhanced. By enhancing the dispersibility, the amount of the binder contained in the electrode for the electric double layer capacitor can be reduced. Thus, it is possible to produce the electrode for the electric double layer capacitor having the low internal resistance and the high electrostatic capacity. In the present invention, in particular as described above, the binder is present more abundantly on the surface than the inside of the mixture particle. Thus, remarkable characteristics that physical properties are good, e.g., the processability of the active material layer and the cohesiveness thereof to the current collector are good as well as the internal resistance is reduced are obtained.

6. Method for Producing Electrode

The method for producing the electrode for the electric double layer capacitor of the present invention has a step of forming the active material layer composed of the electrode material for the electric double layer capacitor of the present invention on the current collector.

As the current collector used for the present invention, for example, metals, carbon and conductive polymers can be used, and suitably the metal is used. As the metal for the current collector, usually aluminum, platinum, nickel, tantalum, titanium, stainless steel and other alloys are used. Among them, it is preferable to use aluminum or an aluminum alloy in terms of conductivity and voltage resistance. The current collector is a film or a sheet, and a thickness thereof is appropriately selected depending on the purpose of use and is usually 1 to 200 µm, preferably 5 to 100 µm and more preferably 10 to 50 µm.

The method for forming the active material layer using the electrode material for the electric double layer capacitor of the present invention is not particularly limited. Preferable examples thereof may include dry molding methods such as a press molding method and wet molding methods such as an application method. The dry molding method is preferable because no drying step is required and thus it is possible to reduce the production cost. The dry molding method used for the production method of the present invention is not particularly limited. Specific examples thereof may include a press molding where the electrode material for the electric double layer capacitor is rearranged, deformed and destroyed by filling the electrode material in a die and adding the pressure thereto to densify the electrode material to mold the active material layer; and an extrusion molding where the active material layer is continuously molded as an endless long sheet such as films and sheets, which is also referred to as a paste extrusion because the electrode material for the electric double layer capacitor becomes the paste when extruded from a molding machine. Among them, it is preferable to use the press molding because it can be performed in a simple instrument. To perform the press molding with the mixture particles, for example, the mixture particles may be sprayed on the current collector using a screw feeder and then the press molding may be performed using a pressure apparatus. It is also possible to continuously mold the active material layer by quantitatively supplying the electrode material onto the protection film or the current collector using the feeder and pressurizing with a roller. In the aforementioned dry mode molding, a small amount of a molding aid agent such as water or alcohol may be added, and the solid content concentration upon molding is usually 50% by weight or more and preferably 70% by weight or more. The temperature upon molding is usually 0 to 200° C., and it is preferable to mold at temperature which is higher by 20° C. or more than the phase transition temperature (glass transition temperature) of the binder.

In order to eliminate unevenness of thickness of the molded electrode and increase the density in the active material layer to make the capacity high, post-pressing may be further performed as needed. As the method for the post-pressing, a press step using the roll is common. In the press step, two cylindrical rolls are arranged above and below the production line with a narrow interval, respective rolls are rotated in opposite directions, and the electrode is sandwiched with them and pressurized. The temperature control such as heating or cooling may be given to the roll.

7. Electric Double Layer Capacitor

The electric double layer capacitor of the present invention has the electrode for the electric double layer capacitor obtained by the aforementioned production method of the present invention. The electric double layer capacitor can be produced according to conventional methods using the aforementioned electrode, an electrolyte and parts such as a separator. Specifically, for example, the electric double layer capacitor can be produced by cutting the electrode for the electric double layer capacitor into an appropriate size, then superposing the electrodes via the separator, placing this in a vessel by winding or folding in a capacitor shape, infusing the electrolyte in the vessel and sealing the vessel.

The electrolyte is not particularly limited. A preferable electrolyte is a nonaqueous electrolyte solution obtained by dissolving the electrolyte in an organic solvent. As the electrolyte, any of those known publicly can be used. Examples thereof may include tetraethyl ammonium tetrafluoroborate, triethylmonomethyl ammonium tetrafluoroborate and tetraethyl ammonium hexafluorophosphate.

The solvent for dissolving the electrolyte (electrolyte solvent) is not particularly limited as long as it is generally used as the electrolyte solvent, and specific examples thereof may include carbonates such as propylene carbonate, ethylene carbonate and butylene carbonate; lactones such as γ-butylolactone; sulfolanes; and nitrites such as acetonitrile, and each of these may be used alone or in combination of two or more. Among them, carbonates are preferable. The concentration of the electrolyte is usually 0.5 mol/L or more and preferably 0.8 mol/L or more. As the electrolyte liquid, an ionic liquid can also be used.

As the separator, for example, a fine pore membrane or a nonwoven cloth made of polyolefin such as polyethylene and polypropylene, and a porous membrane using a pulp generally referred to as electrolytic condenser paper as a major raw material can be used. In place of the separator, a solid electrolyte or a gel electrolyte may also be used.

EXAMPLES

The present invention will be described more specifically with reference to the following Examples and Comparative Examples. The Examples shown below are exemplifications for suitably describing the present invention, and do not limit the present invention. In the following Examples and Comparative Examples, parts and % are based on weights unless otherwise specified.

Example 1

Production of Electrode Material for Electric Double Layer Capacitor

In a polymerization vessel equipped with a stirrer, 150 parts of water, 80 parts of 2-ethylhexyl acrylate, 20 parts of acrylonitrile and 2 parts of tetraethylene glycol dimethacrylate as monomers, 2 parts of sodium dodecylbenzene sulfonate as an anionic surfactant, 0.3 parts of potassium persulfate as an initiator were supplied, and the temperature was raised to 60° C. to initiate a polymerization reaction. The polymerization reaction was performed for 8 hours to yield a latex (A) of an acrylate polymer (particle diameter: 0.15 μm, glass transition temperature: −25° C.). A polymerization conversion ratio was 97%, and a composition ratio of the resulting polymer conformed to an amount ratio of the monomers used. A solid content concentration of the latex (A) was 40%.

Subsequently, 100 parts of activated carbon having a specific surface area of 2,000 $m^2/g$ and an average particle diameter of 5 μm as the electrode active material, 15 parts of the aforementioned latex (A) as the binder, 5 parts of acetylene black (Denka black powders, supplied from Denki Kagaku Kogyo K.K.) having an average particle diameter of 0.7 μm as the conductive material, 70 parts of an aqueous solution containing 2% carboxymethylcellulose (DN-800H supplied from Daicel Chemical Industries, Ltd.) as the dispersant and water were added and mixed using a planetary mixer to yield a mixed liquid (I) having the solid content concentration of 21%. In this mixed liquid (I), pH was 7.0. This mixed liquid (I) was granulated by spray drying with a spray dryer (OC-16 supplied from Ohkawara Kakohki Co., Ltd.) under the condition where a rotation speed of the rotary disc type atomizer (diameter 65 mm) was 20,000 rpm, the temperature of hot wind was 150° C. and the temperature of a particle collection outlet was 90° C. to yield spherical mixture particles. The particle diameter measured using a laser diffraction particle size analyzer (SALD-3100 supplied from Shimadzu Corporation) was 38 μm.

Example 2

Example 1 was followed except that the rotation speed of the atomizer was 25,000 rpm, to obtain mixture particles having a particle diameter of 31 μm.

Example 3

Example 1 was followed except that aqueous ammonia solution was added to the mixed liquid (I) to adjust pH to 8.0, and the mixture was then granulated by spray drying. As a result, mixture particles having a particle diameter of 39 μm were obtained.

Example 4

Example 1 was followed except that 12 parts of the latex (A) was used, to obtain mixture particles having a particle diameter of 39 μm.

Comparative Example 1

5 parts of acetylene black as a conductive material, 70 parts of aqueous solution containing 2% carboxymethylcellulose (DN-800H supplied from Daicel Chemical Industries, Ltd.) as a dispersant, 15 parts of the latex (A) as a binder and water were taken up and mixed using the planetary mixer to yield 135 parts of a mixed liquid (II).

Subsequently, 100 parts of activated carbon powders as an electrode active material were supplied to a fluidized-bed granulator (Aglomaster supplied from Hosokawa Micron Ltd.), and the mixed liquid (II) was sprayed and dried over 10 minutes in air flow at 120° C. to yield mixture particles having a particle diameter of 48 μm. The acetylene black, aqueous solution containing 5% carboxymethylcellulose and activated carbon powders used herein were the same as those used in Example 1.

Comparative Example 2

Polymerization was performed in the same way as in Example 1, except that 2 parts of polyoxyethylene lauryl ether as a nonionic surfactant was used in place of 2 parts of sodium dodecylbenzene sulfonate. As a result, a latex (B) of an acrylate polymer (particle diameter: 0.17 μm, glass transition temperature: −25° C.) was obtained. The polymerization conversion ratio thereof was 97%, and the composition ratio of the resulting polymer conformed to the amount ratio of the monomers used. Subsequently, in the same way as in Example 1 except that the resulting latex (B) was used in place of the latex (A), the electrode active material, the binder, the dispersant and the water were mixed to yield the mixed liquid (III) having the solid content concentration of 21%. In this mixed liquid (III), pH was 7.0. This mixed liquid (III) was granulated by spray drying in the same way as in Example 1 to yield mixture particles having a particle diameter of 41 μm.

Example 5

Comparative Example 2 was followed except that an ammonia aqueous solution was added to the mixed liquid (III) to adjust pH to 8.0, which was then granulated by spray drying. As a result, mixture particles having a particle diameter of 39 μm was obtained.

Comparative Example 3

Mixture particles having a particle diameter of 55 μm was obtained by drying the mixed liquid (I) described in Example 1 at 105° C. for 24 hours and then pulverizing the dried material.

Comparative Example 4

Example 1 was followed except that 10 parts of the latex (A) was used, to obtain mixture particles having a particle diameter of 38 μm.

Electrode materials consisting exclusively of the mixture particles obtained in the aforementioned Examples and Comparative Examples were composed. Using these electrode materials, an active material layer was formed on a current collector. That is, an electrode for the electric double layer capacitor was produced. The method for producing the electrode was as follows.

That is, the resulting electrode material was sprayed on the aluminum current collector which has a thickness of 40 μm. The thickness of the particle layer on the current collector was made even using a blade. The layer was then pressed and molded at 150° C. at pressure of 5 MPa for one minute using a batch-type press molding machine (desktop Test Press 2-S type supplied from Tester Sangyo Co., Ltd.).

Properties of the electrode materials and the electrodes obtained as described above were measured as follows.

(Moldability)

An external appearance of each electrode material after the press was evaluated. The results are shown in Table 4.

TABLE 1

| | Peak shape | Peak position | Half bandwidth |
|---|---|---|---|
| Carbon bound to carbon or hydrogen | GL(30) | 280.5~281.5 eV | 1.4~1.6 eV |
| Carbon bound to oxygen via single bond | GL(30) | Peak position of carbon bound to carbon or hydrogen +1.7~2.3 eV | 1.6~1.8 eV |
| Carbon bound to oxygen via double bond | GL(30) | Peak position of carbon bound to carbon or hydrogen +3.7~4.3 eV | 1.8~2.2 eV |

(Coating Ratio of Electrode Material Surface by Binder)

After the layer of the electrode material was made even using the blade, the layer was analyzed for is orbit of a carbon atom using X ray photoelectron spectrometry (XPS) under the following condition.

Measurement apparatus: AXIS Ultra DLD (supplied from Kratos Analytical Ltd.), X ray anode A1 monochromatic source, anode voltage 15 kV, emission current 10 mA, measurement area slot, operation mode of the analyzer: spectrum, lens mode: hybrid, pass energy 40 eV, scanning type: spectrum, energy type: total energy, center energy 288.45 eV, scanning width 23.1 eV, step size 0.1 eV, measurement time 200 ms and number of sweeps 3.

Using Vision Processing software, peak synthesis was performed with the resulting spectrum, and an atomic percentage (M1) of the carbon which did not bind to one other than carbon and hydrogen and the atomic percentage (M2) of the carbon which bound to oxygen via double bond in all carbon atoms were calculated on the basis of peak areas. Three peaks were synthesized under the conditions of:

the peak of the carbon which did not bind to one other than carbon and hydrogen: peak shape GL (30), peak position 280.5 to 281.5 eV and peak half bandwidth 1.4 to 1.6 eV;

the peak of the carbon which bound to oxygen via double bond: peak shape GL (30), peak position 3.7 to 4.3 eV higher energy side from the peak position of the carbon which bound to carbon or hydrogen and peak half bandwidth 1.8 to 2.2 eV; and the peak of the carbon which bound to oxygen via single bond: peak shape GL (30), peak position 1.7 to 2.3 eV higher energy side from the peak position of the carbon which bound to carbon or the hydrogen and peak half bandwidth 1.6 to 1.8 eV. A curve was fitted so that residual errors were minimized. Subsequently, the binder, the activated carbon powders as the electrode active material and carboxymethylcellulose (DN-800H supplied from Daicel Chemical Industries, Ltd.) used as the dispersant were likewise analyzed using the X ray photoelectron spectrometry. The atomic percentage (A1, B1, C1) of the carbon which did not bind to one other than carbon and hydrogen and the atomic percentage (A2, B2, C2) of the carbon which bound to oxygen via double bond among all carbon atoms were calculated. The results are shown in the following Table 2.

As the binder, the latex was measured. As the carboxymethylcellulose, the 2% aqueous solution was dried in petri dish made of Teflon (registered trade name supplied from DuPont) at 105° C. for 24 hours, and the dried resultant was then measured. All measurements were performed 10 times at different places, and the averaged value thereof was calculated as the measurement value.

TABLE 2

| A1 | 77.25 |
| B1 | 75.01 |
| C1 | 6.25 |
| A2 | 12.37 |
| B2 | 9.66 |
| C2 | 19.63 |

The ratios of the binder, the activated carbon powders and the dispersant present on the particle surface were designated as x, y and z, respectively, and the ration of surface coated by binder (x*100%) was calculated in accordance with the following linear equation with three unknowns. The obtained measurement results are shown in the following Table 3.

$$x+y+z=1$$

$$xA1+yB1+zC1=M1$$

$$xA2+yB2+zC2=M2$$

TABLE 3

|  | M1 | M2 | Surface coating ratio (%) |
|---|---|---|---|
| Example 1 | 65.82 | 13.09 | 69.1 |
| Example 2 | 65.22 | 12.81 | 57.0 |
| Example 3 | 65.33 | 13.29 | 73.3 |
| Example 4 | 66.25 | 12.64 | 56.3 |
| Example 5 | 66.18 | 12.75 | 59.6 |
| Comparative Example 1 | 70.36 | 10.98 | 21.3 |
| Comparative Example 2 | 63.54 | 12.1 | 25.6 |
| Comparative Example 3 | 72.11 | 10.44 | 11.8 |
| Comparative Example 4 | 68.79 | 11.95 | 45.7 |

For the peak synthesis, three peaks were synthesized under the conditions in the aforementioned Table 1, and the curve was fitted so that the residual errors were minimized.

(Flexion Resistance Test of Active Material Layer)

The resulting electrode for the electric double layer capacitor was measured in accordance with the method described in JIS K5600-5-1. Using a test apparatus of type 1, the test was performed by changing the diameter of a cylindrical mandrel to 32, 25, 20, 16, 12 and 10 mm, and the electrode was observed using a magnifying lens to measure the minimum diameter of the mandrel at which crack or peeling occurred. The results are shown in Table 4 below.

(Production and Property Test of Electric Double Layer Capacitor)

Two circular electrodes having the diameter of 12 mm were punched out of the electrode for the electric double layer capacitor obtained above. Active material layer sides of the two electrodes were opposed and a rayon separator having a thickness of 35 μm was sandwiched therewith. This was impregnated under the reduced pressure with the electrolyte obtained by dissolving triethylenemonomethyl ammonium tetrafluoroborate at a concentration of 1.5 mol/L in propylene carbonate, which was then used to make a coin cell CR2032 type electric double layer capacitor.

The resulting electric double layer capacitor was charged with a constant current of 10 mA to 2.7 V at 25° C., and subsequently was discharged with the constant current of 10 mA to 0 V. An electrostatic capacity upon discharge was obtained in accordance with the energy conversion method. The value was then divided by a weight of the active material layer which was obtained by subtracting the weight of the current collector from the weight of the two electrodes, to whereby calculate the electrostatic capacity per unit weight of the active material layer. The internal resistance was calculated in accordance with a standard RC-2377 calculation method prescribed by Japan Electronics and Information Technology Industries Association. The results are likewise shown in the following Table 4.

TABLE 4

|  | Surface coating ratio (Area %) | Moldability (Shape after press) | Flexion resistance test of electrode (Mandrel diameter) | Electrostatic capacity of capacitor (F/g) | Internal resistance of capacitor (ΩF) |
|---|---|---|---|---|---|
| Example 1 | 69.1 | Sheet shape | No crack and no peeling at 10 mm | 28.1 | 9.8 |
| Example 2 | 57.0 | Sheet shape | 12 mm | 27.8 | 10.2 |
| Example 3 | 73.3 | Sheet shape | No crack and no peeling at 10 mm | 28.2 | 9.8 |
| Example 4 | 56.3 | Sheet shape | 12 mm | 27.8 | 10.3 |
| Example 5 | 59.6 | Sheet shape | 12 mm | 27.8 | 10.2 |
| Comp. Example 1 | 21.3 | Sheet shape | 16 mm | 25.5 | 12.4 |
| Comp. Example 2 | 25.6 | Can not be molded (Powder shape) | — | — | — |
| Comp. Example 3 | 11.8 | Sheet shape | 20 mm | 24 | 13.9 |
| Comp. Example 4 | 45.7 | Sheet shape | 16 mm | 26.8 | 11.5 |

As is evident from the aforementioned Table 4, in Examples in which the particle surface coating ratio of the binder on the mixture particles used as the electrode material is 50 area % or more, the moldability is good, the "cohesiveness of the active material layer to the current collector" represented by the flexion resistance and the flexibility of the electrode are high, the electrostatic capacity of the resulting electric double layer capacitor is large and the internal resistance is reduced. On the contrary, in Comparative Examples in which the surface coating ratio by the binder on the mixture particles is less than 50 area %, the active material layer was not moldable and the property of the capacitor was not measurable (Comparative Example 2). Even when the active material layer was molded (Comparative Example 3), the cohesiveness of the active material layer to the current collector is low, the electrostatic capacity is small and the internal resistance is large.

INDUSTRIAL APPLICABILITY

The electrode for the electric double layer capacitor obtained by using the electrode material for the electric double layer capacitor of the present invention has the low electric resistance, and the electric double layer capacitor using this electrode for the electric double layer capacitor has the large electrostatic capacity, and can be suitably used for various usages such as power supply for backup of memories in personal computers and mobile terminals, power supply for measure of instantaneous power outage in personal computers, application to electric automobiles and hybrid automobiles, solar electric power generation storage systems combining with solar battery and road leveling power supply combining batteries.

The invention claimed is:

1. An electrode material for an electric double layer capacitor comprising a mixture particle, containing a binder and an electrode active material, wherein 50 area % or more of the surface of said mixture particle is coated with said binder when analyzed with an X ray photoelectron spectrometry.

2. The electrode material for the electric double layer capacitor according to claim 1, wherein said binder is a polymer having a glass transition temperature.

3. The electrode material for the electric double layer capacitor according to claim 2, wherein said glass transition temperature of said polymer is −80 to +20° C.

4. The electrode material for the electric double layer capacitor according to claim 1, wherein said electrode active material is a particle having the number average particle diameter from 0.01 to 100 μm and said mixture particle has the number average particle diameter from 0.1 to 1,000 μm.

5. The electrode material for the electric double layer capacitor according to claim 1, wherein the shape of said mixture particle is spherical.

6. The electrode material for the electric double layer capacitor according to claim 1, wherein said mixture particle further comprises a conductive material.

7. The electrode material for the electric double layer capacitor according claim 1, wherein the content of said mixture particle is 50% by weight or more.

8. A method for producing the electrode material for the electric double layer capacitor according to claim 1 comprising:
- a step of mixing a raw material, containing said binder having a number average particle diameter from 0.01 to 2 μm and said electrode active material, to yield a mixture A; and
- a step of granulating the resulting mixture A to yield said mixture particle.

9. The method according to claim 8, wherein said raw material further comprises a conductive material.

10. The method according to claim 8, wherein said step of granulating is performed using a spray drying granulation method.

11. The method according to claim 10, wherein said step of mixing said raw material is performed in an aqueous solvent to obtain said mixture A in a form of a mixed liquid dispersion, and said step of granulating is performed by spray drying granulation of said mixed liquid dispersion.

12. The method according to claim 11, wherein said binder is a latex.

13. The method according to claim 12, wherein said latex is produced by an emulsion polymerization method using an anionic surfactant.

14. A method for producing an electrode for an electric double layer capacitor comprising a step of forming an active material layer on a current collector using the electrode material for the electric double layer capacitor of claim 1.

15. The method according to claim 14, wherein said active material layer is formed by a press molding method.

16. An electrode for an electric double layer capacitor obtained by the method according to claim 14.

17. An electric double layer capacitor having the electrode according to claim 16.

* * * * *